J. B. BRACKETT & L. M. MERRILL.
Cotton-Gin.
No. 202,326. Patented April 16, 1878.
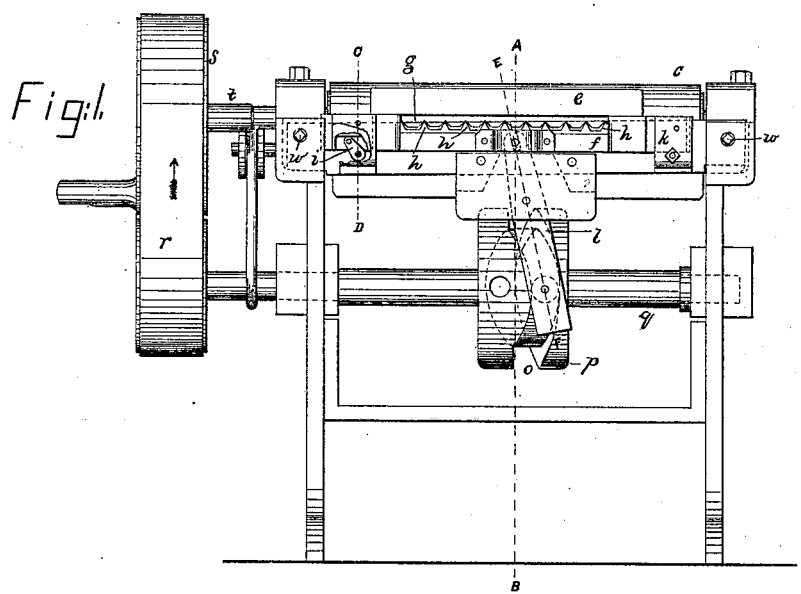
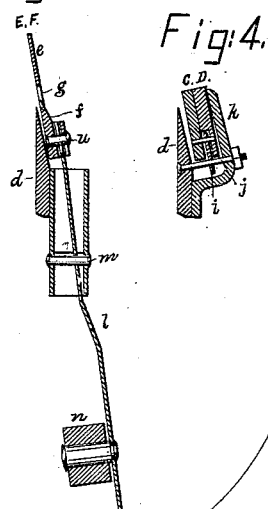
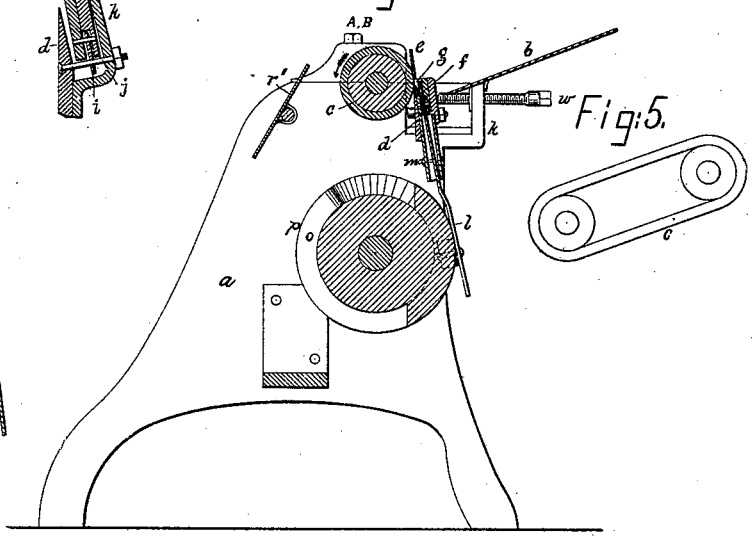
Witnesses.
E. C. Perkins
W. J. Pratt.
Inventors
John B. Brackett and Luther M. Merrill
by Crosby & Mason Attys

UNITED STATES PATENT OFFICE.

JOHN B. BRACKETT AND LUTHER M. MERRILL, OF BOSTON, MASS.

IMPROVEMENT IN COTTON-GINS.

Specification forming part of Letters Patent No. 202,326, dated April 16, 1878; application filed September 17, 1877.

*To all whom it may concern:*

Be it known that we, JOHN B. BRACKETT and LUTHER M. MERRILL, both of Boston, in the county of Suffolk and State of Massachusetts, have invented an Improved Cotton-Gin, of which the following is a specification:

This invention relates to cotton-gins of the class known as "roller-gins," and has special reference to apparatus to loosen and remove the seeds from the cotton as it passes to the roller.

In this machine the cotton is led from the feeding-table through a movable throat-plate which holds the layer of cotton at its upper and lower sides, and moves it up and down in front of the roller and presser, and at the same time teeth at the lower portion of the throat-plate are made to enter the mass of cotton, move laterally with the cotton outside the pressure-plate, and then recede from the cotton. These teeth, entering and moving laterally while engaging the cotton, loosen the seeds from the fiber, and as the teeth are withdrawn, the upper portion of the throat-plate moves toward the top of the presser, drawing the cotton in opposition to the rotation of the roller and the direction of the feed of the cotton, thereby dislodging the seeds.

This throat-plate and the teeth acting upon the mass of cotton in front of the roller draw or comb it a little in first one and then the other direction, at right angles to the feed, and then, by moving the upper portion of the throat toward the presser, the seeds are pushed backward out of the mass of cotton, falling to the floor.

Figure 1 represents, in front view, sufficient of a cotton-gin to illustrate our invention; Fig. 2, a section on line A B, Fig. 1; Fig. 3, a section on line E F; Fig. 4, a section on line C D, Fig. 1; Fig. 5, a modified form of rolling-surface to be used instead of a roller.

The frame $a$, feeding-table $b$, roller $c$, and presser-plate $d$ may be of any usual construction common to roller-gins. In this instance the roller is covered with india-rubber. The throat-plate is, in this instance, composed of a top bar, $e$, and a bottom bar, $f$, connected so as to move together in unison, a space, $g$, being left between them for the passage of cotton to the roll, such cotton passing also between the roll and the top bar $e$. The lower bar $f$ is provided with a series of teeth or points, $h$.

The throat-plate is connected at each end by links $i$ with bolts $j$, extended through the presser-plate and fixed ears $k$, so that such throat-plate, as it is reciprocated in the direction of its length by the lever $l$, pivoted at $m$, will also rise and fall in the arc of a circle in the direction of the axis of the roller. The lever $l$ has a roller, $n$, to enter a groove, $o$, in a cam-hub, $p$, on the rotating shaft $q$, driven by belt $r$, running from the pulley $s$ on the roller-shaft $t$. The upper end of lever $l$ is forked to embrace a pin, $u$, on the lower bar of the throat-plate.

When the throat-plate is in its lowest position, its teeth $h$ are substantially level with the upper edge of the presser-bar $d$, which rests next the roller. Supposing the cotton being fed through the opening of the throat-plate, and being carried forward between the roller and top bar by the roller, the throat-plate, starting from this lowest position, will be moved laterally and upward, and then lowered, it, in its movement, describing an arc of a circle. As the throat-plate is elevated and moved laterally, the teeth enter the cotton and pass above the top of the presser-plate. These teeth prevent the passage forward of the seeds, and, as the bar moves laterally, act to pull back the seeds in opposition to the movement of the fiber, thereby loosening them, so that the upper bar $e$, as the throat-plate descends at the completion of its lateral stroke, will squeeze out or force backward the seeds held at the throat. This movement of the throat-plate, embracing the mass of cotton at bottom and top, in the arc of a circle, or in an elliptical path, loosens and rattles out the seeds from the cotton in a rapid manner not possible if the throat-plate had only a vertical motion.

It is obvious that the mechanical devices for imparting motion to the throat-plate in the arc of a circle having its center at right angles to the axis of the roller $c$ may be variously modified without departing from this invention, and instead of the links and lever, any other well-known or equivalent devices may be employed.

The throat-plate is made to move very rapidly. The throat-plate and presser-bar are arranged to be adjusted toward or from the roller by the same set of adjusting-screws $w$. The rotating doffer $r'$, acting to clear the roller, is of usual construction. The upper bar of the throat-plate might be made to rise and fall only, and the toothed portion, by means of suitable devices, may be reciprocated laterally when above the level of the presser-plate. Such movement would loosen and pull out the seeds. The rotating surface $c$ might be an endless belt. The combined vertical and lateral motion of the throat-plate and teeth may result in a straight-line movement, crossing the path of movement of the cotton angularly instead of in a curve, as before described.

In other roller-gins the vibratory clearer passes at each vibration some distance beyond the edge of the pressure-bar, and at such time cuts off the feed of the cotton to the roller, the latter drawing the fiber from the point where held by the clearer and pressure-bar, often straining and breaking the cotton.

In this our invention, the portion of the throat-plate at the side of the sheet of cotton not in contact with the pressure-bar is never moved past the edge of the pressure-bar, and the feed is not cut off, and consequently the cotton is not so pinched that the roller, in drawing it forward, can break its fiber.

In this machine the seeds are rolled or twisted out from the cotton, whereas in a machine wherein the clearer simply rises and falls, the seeds have to be drawn out against the full force of the cotton.

The bar $e$ regulates the thickness of the layer of cotton passing to the roll, and may be made adjustable to or from the teeth, and it might be fixed in position so as not to rise and fall; but this would not operate as well.

The presser has to be adjusted more or less closely to the rotating surface, according to the kind of cotton being ginned.

In other gins, where the presser and clearer or shipper are independently adjustable, the adjustment of the presser-bar removes it away from the clearer, leaving a space in which the seeds are jammed. To overcome this the clearer has to be subsequently adjusted.

We claim—

1. The combination, with a roller or belt, of a throat-plate having a cross-bar, $e$, and a series of teeth, between which the cotton may pass, substantially as described.

2. The combination, with a roller or belt, and a cross-bar, $e$, extended across the upper side of the cotton being ginned, of a set of teeth having a combined up-and-down and lateral reciprocation with relation to the lower edge of the cross-bar and the axis of rotation of the roller or belt, to operate upon the cotton being drawn forward by it, substantially as set forth.

3. The combination of the roller or belt and a throat-plate having a combined up-and-down and lateral reciprocation to loosen the seeds, as set forth.

4. The combination of the roller or belt, the presser-bar, and the throat-plate, having a combined up-and-down and lateral reciprocation, substantially as set forth.

5. The combination, with the roller or belt, of a presser-bar and throat-plate connected therewith, and a single set of adjusting-screws, to adjust them simultaneously to or from the roll, substantially as described.

In testimony whereof we have signed our names to this specification in the presence of two subscribing witnesses.

JOHN B. BRACKETT.
LUTHER M. MERRILL.

Witnesses:
  G. W. GREGORY,
  W. J. PRATT.